US006989054B2

(12) United States Patent
Tanabe et al.

(10) Patent No.: US 6,989,054 B2
(45) Date of Patent: Jan. 24, 2006

(54) INK JET WHITE INK AND TITANIUM DIOXIDE SLURRY THEREFOR

(75) Inventors: Seiichi Tanabe, Nagano (JP); Kiyohiko Takemoto, Nagana (JP); Seiji Mochizuki, Nagano (JP); Yasunori Yamazaki, Nagano (JP); Toshimasa Mori, Nagano (JP); Kasumi Nakamura, Chiba (JP); Nobuo Uotani, Chiba (JP); Toshio Koshikawa, Chiba (JP); Katsura Ito, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 322 days.

(21) Appl. No.: 10/096,089

(22) Filed: Mar. 12, 2002

(65) Prior Publication Data

US 2003/0052952 A1 Mar. 20, 2003

(30) Foreign Application Priority Data

Mar. 14, 2001 (JP) .......................... P.2001-072753
Mar. 8, 2002 (JP) .......................... P2000-063067

(51) Int. Cl.
*C09D 11/00* (2006.01)
*G01D 11/00* (2006.01)

(52) U.S. Cl. ............... 106/31.86; 106/31.9; 106/31.65; 106/31.75; 347/100

(58) Field of Classification Search ............ 106/31.86, 106/31.9, 31.65, 31.75; 347/100
See application file for complete search history.

(56) References Cited

U.S. PATENT DOCUMENTS

| | | | | |
|---|---|---|---|---|
| 1,412,027 | A | 4/1922 | Washburn | 106/449 |
| 4,448,609 | A * | 5/1984 | Tear et al. | 106/443 |
| 5,264,033 | A * | 11/1993 | Noda et al. | 106/447 |
| 5,630,995 | A | 5/1997 | Foulger et al. | |
| 5,824,145 | A * | 10/1998 | Marganski et al. | 106/442 |
| 5,824,146 | A * | 10/1998 | Ott | 106/442 |
| 6,153,001 | A | 11/2000 | Suzuki et al. | 106/31.65 |
| 6,569,920 | B1 * | 5/2003 | Wen et al. | 523/205 |

FOREIGN PATENT DOCUMENTS

| | | |
|---|---|---|
| EP | 0406194 | 1/1991 |
| EP | 0722905 | 7/1996 |
| GB | 360436 | 11/1931 |
| JP | 60118767 | 6/1985 |
| JP | 4277566 | 10/1992 |

* cited by examiner

*Primary Examiner*—J. A. Lorengo
*Assistant Examiner*—Veronica F. Faison
(74) *Attorney, Agent, or Firm*—Ladas and Parry LLP

(57) ABSTRACT

A titanium dioxide slurry for ink jet ink, which comprises water and surface-treated titanium dioxide particles dispersed in the water, the surface treatment being a treatment with an inorganic phosphoric acid compound. Also disclosed is an ink comprising the titanium dioxide slurry.

10 Claims, No Drawings

INK JET WHITE INK AND TITANIUM DIOXIDE SLURRY THEREFOR

FIELD OF THE INVENTION

The invention relates to an ink of white or the like for use in an ink jet recording apparatus in which droplets of an ink are ejected through fine ink outlets provided in the recording head to form flying droplets, and recording is conducted using the droplets. The present invention also relates to a titanium dioxide slurry for the ink.

BACKGROUND OF THE INVENTION

In recent years, recording by means of an ink jet recording apparatus has been vigorously applied to various printers, copying machines and facsimiles owing to its low noise and ease with respect to speeding up and coloration.

Such an ink jet recording method is a printing method wherein small droplets of an ink are ejected and deposited onto a recording medium.

The ink for the ink jet recording method contains a recording material (dye or pigment) and a liquid medium for dissolving or dispersing it as fundamental components and, if necessary, various additives.

An ink jet white ink provides a recorded product with a good visibility when printed on a surface with a low lightness such as a black surface. In addition, the white ink is also useful for marking industrial products such as those made of plastic products and are also suitable for printing onto woods, metals, glass, porcelain and leather, thus having been investigated from various aspects.

However, conventional white inks suffer sedimentation and aggregation of a pigment due to the difference in specific gravity between pigment particles and a liquid medium, and hence they involve the problem that fine nozzles of the ink jet head are clogged or that they are poor in storage stability.

In addition, there has been the problem that hiding power is insufficient due to the small size of pigment particles.

In order to prevent sedimentation and re-aggregation of pigments, various investigations have been made on the ink. For example, Japanese Patent Laid-Open No. 118767/1985 discloses a technique of adding a polymer containing acrylic ester monomer units for stabilizing dispersion of a pigment, and Japanese Patent Laid-Open No. 145570/1994 proposes to use an ink containing a pigment, a polymeric dispersant, water and a water-insoluble resin emulsion to provide an ink excellent in preventing clogging and in storage stability.

However, in order to acquire a sufficient dispersibility of the pigment, a large amount of the resin emulsion must be added to the ink and, as a result, there may result in a low printed density or blur, thus sufficient printing quality having been difficult to obtain.

As a technology to maintain dispersion stability of a pigment, various methods of surface-treating the raw material titanium dioxide have also been proposed. For example, Japanese Patent Laid-Open No. 277566/1992 discloses that use of titanium dioxide pigment having been surface-treated with an organic phosphoric acid ester in a thermoplastic resin serves to enhance dispersibility of the titanium dioxide pigment.

However, since titanium dioxide having been surface-treated with an organic phosphoric acid ester has a poor surface polarity, though it is stable when dispersed in a resin, it is unstable when dispersed in water. Thus, in the case of using it in an ink jet ink, there results formation of a precipitate in the ink or clogging of nozzles.

SUMMARY OF THE INVENTION

The invention has been made for solving the above-described problems.

Accordingly, an object of the present invention is to provide an ink for use in an ink jet recording apparatus for recording characters and images on a recording medium such as paper with a liquid ink, which is excellent in each of dispersion stability, clogging-preventing properties in printing head, ejection stability, storage stability, and hiding power.

Another object of the invention is to provide a titanium dioxide slurry for the ink.

Other objects and effects of the invention will become apparent from the following description.

As a result of extensive investigations to solve the problems, the inventors found that a specific slurry, which is a slurry of titanium dioxide particles having been surface-treated with at least one member selected from the group of inorganic phosphoric acid compounds is excellent in each of dispersion stability, clogging-preventing properties in printing head, ejection stability, storage stability, and hiding power, as a raw material for a white ink for ink jet recording, thus having completed the invention based on the finding.

That is, the present invention provides a titanium dioxide slurry for ink jet ink, which comprises water and surface-treated titanium dioxide particles dispersed in said water, said surface treatment being a treatment with an inorganic phosphoric acid compound.

The inorganic phosphoric acid compound is preferably at least one member selected from the group consisting of phosphoric acid, phosphoric acid, ammonium phosphate and diammonium hydrogenphosphate.

Further, the concentration of the surface-treated titanium oxide particles in the slurry is preferably in the range of from 30 to 70% by weight.

The surface-treated titanium dioxide particles preferably have a dispersed particle diameter distribution satisfying the following relationships:

$0.1 \leqq d_{10} < 0.15$ ($\mu$m), $0.15 \leqq d_{50} < 0.25$ ($\mu$m), and $0.25 \leqq d_{90} < 0.4$ ($\mu$m)

wherein $d_{10}$, $d_{50}$ and $d_{90}$ denote particle diameters corresponding to cumulative weight fractions of 10%, 50% and 90%, respectively.

The slurry preferably has a pH in the range of from 5 to 9.

The slurry preferably has a viscosity in the range of from 3.0 to 10.0 mpa·s.

Further, the slurry preferably has a surface tension in the range of from 50 to 71 mN/m.

The present invention also provides a white ink for ink jet recording comprising the above-described titanium dioxide slurry.

The content of the titanium dioxide slurry in the ink is preferably 1 to 50% by weight in terms of pure titanium oxide based on the total weight of the white ink.

The ink can contain at least one of a water-soluble organic solvent, a wetting agent, a polymeric dispersant and a surfactant.

The present invention also provides an ink jet ink comprising the above-described titanium dioxide slurry and at least one of other pigments and dyes.

The ink can contain at least one of a water-soluble organic solvent, a wetting agent, a polymeric dispersant and a surfactant.

DETAILED DESCRIPTION OF THE INVENTION

The invention is described in more detail below.

The titanium dioxide particles to be used in the titanium dioxide slurry of the invention may be any of those having an anatase type crystal structure, those having a rutile type structure or a combination thereof.

The above-described titanium dioxide can be produced by various known processes such as a sulfuric acid process and a chlorination process.

Of these, the sulfuric acid process is generally a process of leaching titanium-containing ores with sulfuric acid to obtain a titanium sulfate solution, subjecting this titanium sulfate solution to hydrolysis to obtain a precipitate of hydrated titanium. This precipitate is calcined in the presence of a suitable additive to obtain titanium of a desired crystal structure. In this occasion, it is possible to conduct surface treatment to thereby impart a coat of a metal oxide. The thus obtained product is finally pulverized to a desired particle size to obtain intended titanium dioxide particles.

On the other hand, the chlorination process is a process of oxidizing a titanium halide such as titanium tetrachloride in a gas phase at an elevated temperature, and finally pulverizing the resultant titanium dioxide to adjust to a desired particle size, thus intended titanium dioxide particles being obtained.

Additionally, the above-described titanium dioxide particles may have a coat of a hydrated oxide or oxide of a metal such as aluminum, silicon, titanium, zirconium, tin or cerium.

The titanium dioxide slurry of the invention is a slurry obtained by treating the above-described titanium dioxide particles with an inorganic phosphoric acid compound and slurrying the treated product. Here, the treatment of the titanium dioxide particles with an inorganic phosphoric acid compound means to deposit, carry or coat the inorganic phosphoric acid compound on the surface of the titanium dioxide particles upon or after the calcination.

Specific examples of the inorganic phosphoric acid compound to be used in the invention include pyrophosphoric acid, tripolyphosphoric acid, tetrapolyphosphoric acid, trimetaphosphoric acid, tetrametaphosphoric acid, hexametaphosphoric acid and salts of these acids, as well as phosphoric acid, ammonium phosphate, diammonium hydrogenphosphate, monopotassium phosphate, calcium monohydrogenphosphate, monosodium phosphate and dipotassium hydrogenphosphate. Additionally, in the invention, the above-described various phosphoric acid compounds may be used in combination of two or more thereof.

Of these phosphoric acid compounds, phosphoric acid, ammonium phosphate and diammonium hydrogenphosphate are more preferred. Particularly, ammonium salts of phosphoric acid are preferred.

The surface treatment of the titanium dioxide particles with these inorganic phosphoric acid compounds serves to improve dispersibility of the particles in water, and an ink using the surface-treated particles difficultly cause inconvenience such as clogging.

The titanium dioxide surface-treated with the inorganic phosphoric acid compound for use in the invention has been treated with preferably 0.1 to 5% by weight, more preferably 0.3 to 2% by weight, of the above-described phosphoric acid compound based on the weight of the titanium dioxide. In case where the amount of the used inorganic phosphoric acid compound is less than 0.1% by weight, the titanium dioxide particles might not be stably dispersed in the slurry. Conversely, in case where the amount exceeds 5% by weight, the pH of the slurry becomes so low that, in some cases, there might arise problems with respect to storage stability, etc.

As the surface-treating agent to be used for the titanium dioxide slurry of the invention, inorganic salts such as a potassium compound and an aluminum compound may be used in combination with the aforesaid phosphoric acid compound.

Then, the method for surface-treating the titanium dioxide of the invention is described below.

The surface treatment with the inorganic phosphoric acid compound may be conducted simultaneously with or after calcination.

The method of conducting the surface treatment upon calcination comprises conducting the calcining step after adding at least one of the inorganic phosphoric acid compounds to hydrated titanium oxide. Titanium dioxide produced by the following process exhibits particularly remarkable effects in the invention. An aqueous solution of titanium sulfate is heated in the presence of a suspension of nuclei comprising non-rutile-forming nuclei to precipitate hydrated titanium oxide from the titanium sulfate aqueous solution. The nuclei suspension is a suspension prepared in the substantial absence of aluminum ion. Subsequently, the hydrated titanium oxide precipitate is separated from the aqueous solution, and this hydrated titanium oxide is subjected to the calcination step in the presence of at least one potassium compound, at least one phosphorus compound and at least one aluminum compound. In the calcination step, the hydrated titanium oxide is heated to a temperature of 1000 C or above to convert to anatase type titanium dioxide, thus anatase type titanium dioxide surface-treated with the inorganic phosphoric acid compound being obtained.

Then, the method of conducting the surface treatment after calcination is described below. The calcined titanium dioxide is surface-treated, if necessary, with a hydrated oxide or oxide of a metal such as aluminum, silicon, titanium, zirconium, tin or cerium. As a method for conducting the surface treatment with such a hydrated oxide or oxide, various known methods commonly conducted may be selected. For example, there may be employed a method of adding a water-soluble compound of the above-described metal to an aqueous slurry of titanium dioxide, and neutralizing the slurry to deposit a hydrated oxide of the metal on the surface of the titanium oxide particles, followed by filtration and drying. Subsequently, the titanium dioxide is treated with the above-described phosphoric acid compound. As a method for the treatment, there are illustrated a method of mixing dried titanium dioxide particles with the phosphoric acid compound, a method of spraying the phosphoric acid compound against titanium dioxide, a method of dipping titanium dioxide in the phosphoric acid compound, and a method of using a fluid energy pulverizer. Additionally, in the case of employing the process of mixing the titanium dioxide and the phosphoric acid compound, there may be used a mixing machine such as a Henschel mixer, a V-shaped mixer, a screw conveyer or a puddle mixer. Also, in the case of using the fluid energy pulverizer, titanium dioxide is mixed with the phosphoric acid compound, and the mixture is circulated to pulverize. As the fluid energy pulverizer, there may be used a jet mill. As the fluid body, there may be used compressed air or heated steam. By the above-described treatment, there is obtained a titanium dioxide pigment having been surface-treated with the inorganic phosphoric acid compound.

The titanium dioxide slurry in the invention is a slurry which is prepared by dispersing in water titanium dioxide having been treated with the above-described inorganic phosphoric acid compound. The concentration of the surface-treated titanium dioxide is preferably 30 to 70% by weight, more preferably 40 to 65% by weight, still more preferably 50 to 60% by weight. In case where the concentration is more than 70% by weight, it becomes difficult to stably disperse titanium dioxide whereas, in case where the concentration is less than 30% by weight, there results a poor hiding power upon printing, thus such concentration not being preferred.

As the water for use in the invention, pure water such as ion-exchanged water, ultrafiltrated water, reverse osmosis water or distilled water, or ultrapure water may be used. In addition, sterile water sterilized by irradiation with UV rays or by adding hydrogen peroxide is preferred since generation of fungi or bacteria can be prevented in the case of storing the slurry or the ink for a long time.

The titanium dioxide particles having been surface-treated with the inorganic phosphoric acid compound to be contained in the titanium dioxide slurry of the invention have an average primary particle size of 0.01 to 1.0 μm, preferably 0.05 to 0.5 μm, more preferably 0.05 to 0.4 μm. In case where the average primary particle size is less than 0.01 μm, there results an insufficient hiding power whereas, in case where more than 1.0 μm, the particles soon settle down upon being dispersed in water, thus a stable slurry not being obtained. The term "average primary particle size" as used herein means the value viewed by means of a transmission electron microscope.

In the titanium dioxide slurry in the invention, the surface-treated titanium dioxide particles are dispersed in water preferably with the following particle size distribution. Here, the particle size distribution is represented in terms of $d_{10}$, $d_{50}$ and $d_{90}$. The symbols $d_{10}$, $d_{50}$ and $d_{90}$ represent particle size (diameter) corresponding to a cumulative weight fraction of 10%, 50% and 90%, respectively, in a cumulative curve of weight fraction vs particle size (diameter). In a preferred particle size distribution, the following relationships are satisfied:

$0.1 \leqq d_{10} < 0.15$ (μm), $0.15 \leqq d_{50} < 0.25$ (μm), and $0.25 \leqq d_{90} < 0.4$ (μm).

In a more preferred embodiment, the following relationships are satisfied:

$0.11 \leqq d_{10} < 0.15$ (μm), $0.19 \leqq d_{50} < 0.21$ (μm), and $0.26 \leqq d_{90} < 0.31$ (μm).

In case where the particle size distribution is wider than the above-described range ($d_{10}$ is smaller, and $d_{90}$ is larger), there results poor ejection stability, thus such distribution not being preferred. Additionally, the particle size herein is a value measured by means of Microtrack UPA (made by Honeywell) without conducting the pre-treatment of ultrasonic dispersion.

In dispersing the titanium dioxide particles of the invention in water to make a slurry, there may be used a dispersing machine such as a pot mill, a ball mill, a beads mill, a sand mill, an ultrasonic homogenizer, Dyno mill, Igar motor mill or a nanomizer.

Dispersing time varies depending on a particular dispersing machine used, but the aforesaid particle size distribution can be obtained by selecting an optimal dispersing time.

The titanium dioxide slurry of the invention is a slurry which is prepared by dispersing in water the titanium dioxide pigment having been surface-treated with the phosphoric acid compound, to have a pH preferably in the range of from 5 to 9, more preferably from 6 to 8, still more preferably from 6.5 to 7.5. In case where the pH value is less than 5 or more than 9, other members such as a head might be damaged, thus such pH not being suitable. Since pH is influenced by the amount of added phosphoric acid compound, it is necessary to adjust the amount of the phosphoric acid compound so that the pH value falls within the above-described range.

The pH as used herein means a pH value measured at 25° C. using a pH meter, F-23 (made by Horiba Seisakusho).

The titanium dioxide slurry of the invention has a viscosity of preferably 3.0 to 10.0 mPa·s, more preferably 3.0 to 8.0 mPa·s, still more preferably 3.0 to 6.0 mPa·s. In case where the viscosity is larger than 10.0 mpa·s, the resulting ink has such a high viscosity that ejection of the ink becomes impossible, thus such viscosity not being suitable. On the other hand, in case where the viscosity is less than 3.0 mPa·s, the dispersion stability of the resultant slurry might become lowered. The viscosity as used herein means a viscosity value measured at 25° C. and 50 rpm using E viscometer (made by Tokimec Inc.).

The titanium dioxide slurry of the invention has a surface tension preferably in the range of from 50 to 71 mN/m, more preferably 55 to 71 mN/m, still more preferably 60 to 71 mN/m. In case where the surface tension is less than 50 mN/m, there is a possibility that, when a solvent and various additives are added to the slurry to prepare an ink composition, the surface tension of the resultant ink might be smaller than 30 to 40 mN/m which range is believed to be optimal as an ink, and there arise problems that dots are liable to be blurred and distinct printing cannot be attained, thus such surface tension not being suitable.

The surface tension as used herein is a surface tension value obtained by measuring at 25° C. using a tensiometer, CBVP-Z (made by Kyowa Kaimen Kagaku).

To the titanium dioxide slurry of the invention may be added the following surfactants in order to more improve its dispersibility. As such surfactants, there may be used anionic, nonionic, cationic or amphoteric surfactants. As the anionic surfactants, there may be illustrated fatty acid salts, alkylsulfate salts, alkylarylsulfonic acid salts, alkylnaphthalenesulfonic acid salts, dialkylsulfonic acid salts, dialkylsulfosuccinic acid salts, alkyldiaryl ether disulfonic acid salts, alkylphosphoric acid salts, polyoxyethylene alkyl ether sulfates, naphthalenesulfonic acid-formalin condensate, polyoxyethylene alkylphosphoric acid ester salts, glycerol borate fatty acid esters and polyoxyethylene glycerol fatty acid esters. As the nonionic surfactants, there may be illustrated polyoxyethylene alkyl ethers, polyoxyethylene alkylaryl ethers, polyoxyethylene oxypropylene block copolymers, sorbitan fatty acid esters, polyoxyethylene sorbitan fatty acid esters, polyoxyethylene sorbitol fatty acid esters, glycerin fatty acid esters, polyoxyethylene fatty acid esters, polyoxyethylene alkylamines and fluorine- or silicon-containing nonionic surfactants. As the cationic surfactants, there may be illustrated alkylamine salts, quaternary ammonium salts, alkylpyridinium salts and alkylimidazolium salts. As the amphoteric surfactants, there may be illustrated alkylbetaines, alkylamine oxides and phosphatidyl choline.

The titanium dioxide slurry of the invention may further contain commonly used various additives such as an antifungal agent, a thickening agent, a defoaming agent and a pH-adjusting agent.

Next, an ink jet white ink comprising the titanium dioxide slurry of the invention is described below.

The white ink is an ink prepared by adding water, a water-soluble organic solvent, a wetting agent, a polymeric dispersant, a surfactant and other various additives to the titanium dioxide slurry. However, components other than the titanium dioxide slurry are not always necessary, and may be added as demanded. In addition, each component may be used as a mixture of two or more thereof.

The amount of the titanium dioxide slurry, in terms of pure titanium dioxide, in an ink composition is preferably in the range of from about 1 to about 50% by weight, more preferably from 3 to 30% by weight, based on the total weight of the ink. In case where the amount is less than 1% by weight, there results a decreased hiding power upon printing whereas, in case where more than 50% by weight, there might arise problems with respect to dispersibility of titanium dioxide particles or prevention of clogging of nozzles in the printing head.

The solvent for use in the ink composition of the invention preferably comprises water and a water-soluble organic solvent. As the water, pure water such as ion-exchanged water, ultrafiltrated water, reverse osmosis water or distilled water, or ultrapure water may be used. In addition, sterile water sterilized by irradiation with UV rays or by adding hydrogen peroxide is preferred since generation of fungi or bacteria can be prevented in the case of storing the ink composition for a long time.

Also, the water-soluble organic solvent is preferably a low-boiling organic solvent exemplified by methanol, ethanol, n-propyl alchohol, iso-propyl alcohol, n-butanol, sec-butanol, iso-butanol and n-pentanol. In particular, monohydric alcohols are preferred. The low-boiling organic solvent serves to shorten the time required for the ink to dry. The low-boiling organic solvent is added in an amount of preferably 0.5 to 10% by weight, more preferably 1.5 to 6% by weight, based on the weight of the ink.

The ink of the invention preferably further contains a wetting agent such as a high-boiling organic solvent. Preferred examples of the wetting agent include polyhydric alcohols such as ethylene glycol, diethylene glycol, triethylene glycol, polyethylene glycol, polypropylene glycol, propylene glycol, butylene glycol, 1,2,6-hexanetriol, thioglycol, hexylene glycol glycerin, trimethylolethane and trimethylolpropane; alkyl ethers of polyhydric alcohol such as ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether and triethylene glycol monobutyl ether; urea; 2-pyrrolidone; N-methyl-2-pyrrolidone; and 1,3-dimethyl-2-imidazolidinone.

These wetting agents are added in an amount of preferably 0.5 to 40% by weight, more preferably 2 to 20% by weight, based on the weight of the ink.

As a preferred example of the polymeric dispersant to be used in the white ink of the invention, there are illustrated a natural polymer. Specific examples thereof include proteins such as glue, gelatin, casein and albumin; natural gums such as arabic gum and tragacanth gum; glycosides such as saponin; alginic acid and alginic acid derivatives such as propylene glycol alginate, triethanolamine salt of alginic acid and ammonium alginate; and cellulose derivatives such as methyl cellulose, carboxymethyl cellulose, hydroxyethyl cellulose and ethyl hydroxycellulose. Further, as preferred examples of the polymeric dispersant, there are illustrated synthetic polymers such as polyvinyl alchohols; polyvinylpyrrolidones; acrylic resins, e.g., polyacrylic acid, acrylic acid/acrylonitrile copolymer, potassium acrylate/acrylonitrile copolymer, vinyl acetate/acrylic ester copolymer and acrylic acid/acrilic ester copolymer; styrene-acrylic resins, e.g., styrene/acrylic acid copolymer, styrene/methacrylic acid copolymer, styrene/methacrylic acid/acrylic ester copolymer, styrene/alpha-methylstyrene/acrylic acid copolymer and styrene/alpha-methylstyrene/acrylic acid/acrylic ester copolymer; styrene/maleic acid copolymer; styrene/maleic anhydride copolymer; vinylnaphthalene/acrylic acid copolymer; vinylnaphthalene/maleic acid copolymer; vinyl acetate-based copolymers, e.g., vinyl acetate/ethylene copolymer, vinyl acetate/vinyl ester of fatty acid/ethylene copolymer, vinyl acetate/maleic ester copolymer, vinyl acetate/crotonic acid copolymer and vinyl acetate/acrylic acid copolymer; and salts thereof. Of these, copolymers between a monomer having a hydrophobic group and a monomer having a hydrophilic group such as styrene/acrylic acid copolymer and styrene/methacrylic acid copolymer; and polymers comprising a monomer having both a hydrophobic group and a hydrophilic group in the molecular structure are particularly preferred.

The white ink of the invention may further contain a surfactant. Such surfactant is exemplified by anionic surfactants (e.g., sodium dodecylbenzenesulfonate, sodium laurate and ammonium salt of polyoxyethylene alkyl ether sulfate), nonionic surfactants (e.g., polyoxyethylene alkyl ether, polyoxyethylene alkyl ester, polyoxyethylene sorbitan fatty acid ester, polyoxyethylene alkylphenyl ether, polyoxyethylene alkylamine and polyoxyethylene alkylamide), acetylene glycol (Orfin Y, and Surfynol 82, 104, 440, 465 and 485 (all being products of Air Products and Chemicals Inc.)), and phosphoric ester-based surfactants (Phosphanol R-410, RS-610, RS-710 (all being products of Toho Kagaku Kogyo K. K.)). These may be used singly or in combination of two or more threof.

In addition, a pH-adjusting agent, an antiseptic, an antifungal agent and an antioxidant may be added as demanded.

Also, a pale color ink may be prepared by further adding other pigments and/or dyes than titanium dioxide in a suitable amount.

As the dyes or the pigments, there may be illustrated various ones, with those which are alkali-soluble being preferred.

To illustrate specific examples of the dyes, there are illustrated, as direct dyes, C.I. Direct Black 2, 4, 9, 11, 14, 17, 19, 22, 27, 32, 36, 38, 41, 48, 49, 51, 56, 62, 71, 74, 75, 77, 78, 80, 91, 105, 106, 107, 108, 112, 113, 17, 122, 132, 146, 151, 154 and 194; C.I. Direct Blue 1, 2, 6, 8, 10, 14, 15, 22, 25, 34, 69, 70, 71, 72, 75, 76, 78, 80, 81, 82, 83, 86, 90, 95, 98, 106, 108, 110, 120, 123, 158, 159, 163, 165, 192, 193, 194, 195, 196, 199, 200, 201, 202, 203, 207, 218, 236, 237, 239, 246 and 258; C.I. Direct Brown 1A, 2, 6, 25, 27, 31, 44, 52, 58, 95, 100, 101, 106, 112, 173, 194, 195, 209, 210, 211 and 222; C.I. Direct Green 1, 6, 8, 26, 28, 33, 37, 59, 63 and 64; C.I. Direct Orange 6, 8, 10, 26, 29, 32, 39, 40, 41, 46, 49, 51 and 102; C.I. Direct Red 1, 2, 4, 8, 9, 11, 13, 17, 20, 23, 24, 26, 28, 31, 33, 37, 39, 44, 46, 47, 48, 51, 54, 59, 62, 72, 75, 76, 79, 80, 81, 83, 90, 99, 101, 111, 113, 145, 189, 220, 225, 230 and 234; C.I. Direct Violet 1, 7, 9, 12, 35, 47, 48, 51, 66, 90 and 94; and C.I. Direct Yellow 1, 2, 4, 8, 11, 12, 22, 24, 26, 27, 28, 29, 33, 34, 39, 41, 42, 48, 50, 51, 58, 72, 85, 86, 87, 88, 98, 100, 106, 110, 132, 142 and 144.

Acid dyes include, for example, C.I. Acid Black 1, 2, 7, 16, 17, 21, 24, 26, 28, 31, 41, 48, 52, 56, 58, 60, 63, 84, 94, 107, 109, 112, 118, 119, 121, 122, 123, 131, 155, 156, 172, 194 and 208; C.I. Acid Blue 1, 7, 9, 15, 22, 23, 25, 27, 29, 40, 41, 43, 45, 47, 49, 51, 53, 55, 56, 59, 62, 69, 74, 77, 78, 83, 90, 91, 92, 93, 102, 104, 111, 113, 117, 120, 124, 126, 145, 158, 161, 167, 171, 175, 183, 185, 193, 229, 234, 236 and 254; C.I. Acid Brown 4, 6, 8, 14, 17, 20, 102 and 105; C.I. Acid Green 3, 5, 9, 12, 16, 19, 20, 25, 27, 35, 41 and 95; C.I. Acid Orange 1, 2, 7, 8, 10, 14, 19, 20, 24, 28, 33, 51, 52, 56, 61, 63, 64, 67, 74, 92, 125, 127 and 156; C.I. Acid Red 1, 2, 4, 666, 8, 13, 14, 15, 18, 19, 21, 26, 27, 30, 32, 33, 34, 35, 37, 38, 40, 42, 45, 51, 52, 54, 57, 73, 80, 82, 83, 85, 87, 88, 89, 92, 94, 97, 99, 101, 106, 108, 110, 111, 114, 119, 128, 129, 131, 134, 135, 138, 145, 151, 154, 155, 161, 172, 176, 179,180, 183, 184, 186, 187, 214, 243, 248, 249, 254, 256, 257, 266, 270, 288, 289, 296, 317, 318, 337 and 351; C.I. Acid Violet 1, 7, 9, 11, 15, 17, 34, 35, 41, 43, 49, 56, 58 and 75; and C.I. Acid Yellow 1, 3, 4, 7, 9, 11, 12, 13, 14, 17, 18, 19, 23, 25, 29, 34, 36, 38, 40, 41, 42, 44, 49, 53, 55, 56, 59, 61, 62, 65, 71, 72, 73, 76, 78, 99, 111, 114, 116, 118, 121, 122, 129, 135, 161, 162, 171, 172, 183, 199 and 201.

Basic dyes include, for example, C.I. Basic Black 2 and 8; C.I. Basic Blue 1, 3, 5, 7, 9, 24, 25, 26, 28 and 29; C.I. Basic Brown 1 and 12; C.I. Basic Green 1 and 4; C.I. Basic Orange 2, 15, 21 and 22; C.I. Basic Red 1, 2, 9, 12, 13 and 37; C.I. Basic Violet 1, 3, 5, 7, 9, 24, 25, 26, 28 and 29; and C.I. Basic Yellow 1, 2, 11, 12, 14, 21, 32 and 36.

Reactive Dyes include, for example, C.I. Reactive Black 1, 3, 5, 6, 8, 12 and 14; C.I. Reactive Blue 2, 5, 7, 12, 13, 14, 15, 17, 18, 19, 20, 21, 25, 27, 28, 37, 38, 40, 41 and 71; C.I. Reactive Brown 1, 7 and 16; C.I. Reactive Green 5 and 7; C.I. Reactive Orange 2, 5, 7, 16, 20 and 24; C.I. Reactive Red 6, 7, 11, 12, 15, 17, 21, 23, 24, 35, 36, 42, 63 and 66; C.I. Reactive Violet 2, 4, 5, 8 and 9; and C.I. Reactive Yellow 1, 2, 3, 13, 14, 15 and 17.

Dyes for food include, for example, C.I. Food Black 2; C.I. Food Blue 3, 4 and 5; C.I. Food Green 2 and 3; C.I. Food Red 2, 3, 7, 9, 14, 52, 87, 92, 94, 102, 104, 105 and 106; C.I. Food Violet 2; and C.I. Food Yellow 3, 4 and 5.

Disperse dyes include, for example, C.I. Disperse Blue 1, 3 and 14; C.I. Disperse Orange 1, 3, 13 and 25; C.I. Disperse Red 1, 13 and 19; and C.I. Disperse Yellow 3, 5, 7 and 9.

Further, as preferred dyes, there are illustrated azo dyes. Examples thereof include C.I. Acid Black 1, 21, 24, 26, 41, 48, 52, 60, 63, 84, 94 and 123; C.I. Acid Blue 1, 7, 9, 15, 25, 27, 43, 45, 47, 59, 62, 69, 77, 78, 83, 90, 92, 102, 104, 113, 120, 158, 161 and 193; C.I. Acid Brown 6, 8, 14, 17, 20, 102 and 105; C.I. Acid Green 3, 5, 9, 12, 19, 20, 25, 35 and 95; C.I. Acid Orange 1, 6, 7, 8, 10, 14, 19, 20, 24, 28, 33, 51, 52, 61, 63, 67, 74, 92, 125, 127 and 156; C.I. Acid Red 1, 2, 13, 14, 18, 27, 32, 33, 35, 37, 42, 52, 73, 85, 87, 88, 89, 97, 99, 101, 106, 111, 114, 128, 134, 138, 145, 151, 154, 161, 179, 180, 183, 186, 214, 248, 249, 266, 288, 296, 337 and 351; C.I. Acid Violet 1, 7, 9, 17, 56 and 58; C.I. Acid Yellow 7, 9, 11, 17, 19, 23, 25, 29, 36, 38, 40, 42, 44, 49, 56, 59, 62, 65, 72, 76, 99, 118, 121, 129, 135, 161, 162, 171, 183, 199 and 201; C.I. Direct Black 4, 17, 19, 22, 32, 38, 80, 91, 122 and 154; C.I. Direct Blue 1, 2, 6, 10, 14, 15, 22, 25, 71, 76, 78, 80, 95, 98, 159 and 218; C.I. Direct Brown 2, 27, 31, 52, 95, 100 and 222; C.I. Direct Green 1, 6, 26, 28, 33 and 59; C.I. Direct Orange 6, 26, 29, 32, 39, 40, 46 and 102; C.I. Direct Red 2, 4, 23, 24, 26, 31, 37, 39, 54, 62, 75, 76, 79, 80, 81, 83, 99, 111, 113, 220 and 234; C.I. Direct Violet 7, 9, 35, 47, 48, 51 and 66; and C.I. Direct Yellow 4, 8, 11, 12, 22, 26, 27, 29, 33, 44, 50 and 106.

These compounds may be used singly or as a mixture of two or more in any mixing ratio. When the dye contains an acidic group such as a sulfonic acid or carboxylic acid within its structure, it may be of acid form or the salts thereof, or composites thereof. The kinds of the salts may be the same or different. Similarly, when the dye contains a basic group such as amine, it may be of base form or the salts thereof, or composites thereof. The kinds of the salts may be the same or different.

The pigments are exemplified by organic pigments (e.g., azo lakes, insoluble azo lakes, condensed azo lakes, chelate azo lakes, phthalocyanine pigments, perylene pigments, perynone pigments, quinacridone pigments, thioindigo pigments, isoindolinone pigments, quinophthalone pigments, dioxazine pigments, anthraquinone pigments, nitro pigments, nitroso pigments and Aniline Black) and inorganic pigments (e.g., zinc flower, white lead, carbon black, red iron oxide, vermilion, cadmium red, yellow lead, ultramarine, cobalt blue, cobalt violet and zinc chromate). These compounds may be used singly or as a mixture of two or more thereof in any mixing ratio.

The white ink of the invention can be produced by dispersing and mixing the above-described components in an appropriate manner. Preferably, water, the water-soluble organic solvent, the pH-adjusting agent, the antiseptic and the antifungal agent are added to the titanium dioxide slurry comprising dispersed in water titanium dioxide having been treated with the phosphoric acid compound, followed by sufficient dissolving to prepare an ink liquid. After sufficient stirring, coarse particles and foreign substance which cause clogging are filtered off to obtain the intended ink composition.

The titanium dioxide slurry and the white ink of the invention may also be used for an ink jet recording method which comprises ejecting two liquids including an ink composition and a reactive solution to a recording medium to conduct good recording as shown in Japanese Patent Laid-Open No. 158793/2000.

The recording method of ejecting two liquids to a recording medium is an ink jet recording method which comprises depositing an ink composition and a reactive solution onto a recording medium to conduct recording, wherein the ink composition contains at least the titanium dioxide slurry having been treated with the phosphoric acid compound, either of an oligomer and a monomer, and an aqueous solvent, and the reactive solution contains at least a photopolymerization initiator, either of an monomer and an oligomer, and an aqueous solvent, provided that, when one of the ink composition and the reactive solution contains an oligomer, the other contains a monomer, and that the ink composition is deposited to the recording medium prior to the reactive solution. After bringing the ink composition into contact with the reactive solution, the photopolymerization initiator is irradiated with light to conduct a curing reaction of polymerizing the monomer and the oligomer. The light irradiation may be irradiation with visible light or irradiation with UV rays, with the latter being particularly preferred. This method can provide a printed matter even on the surface of a medium into which an aqueous medium cannot penetrate, such as a metal or a plastic, with excellent distinctness and abrasion resistance.

As the oilgomer to be used in the two-liquid type recording method, there are illustrated, for example, polyester acrylate, polyurethane acrylate, epoxy acrylate, polyether acrylate, oligoacrylate, alkyd acrylate and polyol acrylate in terms of the skeletone-constituting molecular structure, with polyester acrylate and polyurethane acrylate being preferred.

As the oilgomer to be used in the two-liquid type recording method, those having a molecular weight of from about 500 to about 10,000, preferably from 5,000 to 10,000 are used.

In the case where the oligomer is contained in the ink composition for use in the two-liquid type recording method, the content of the oligomer in the ink composition is in the range of from about 1 to 50% by weight, preferably from about 3 to about 30% by weight.

The monomer to be contained in the ink composition for use in the two-liquid type recording method means a molecule capable of being a structural unit of the fundamental structure of a polymer. In addition, the monomer as used herein is also called a photopolymerizable monomer and includes monofunctional acrylates and polyfunctional acrylates.

These monomers have a structure of acrylate of a low molecular polyol and are characterized in that they have a low viscosity and show rapid curing properties.

Typical examples of the monomer for use in the two-liquid type recording method include diethylene glycol diacrylate, neopentyl glycol diacrylate, 1,6-hexanediol diacrylate, trimethylolpropane triacrylate, pentaerythritol triacrylate, dipentaerythritol hexaacrylate, acryloylmorpholine, 2-phenoxyethyl acrylate, (2,2,2-triacryloyloxymethyl)ethyl hydrogenphthalate and dipentaerythritol polyacrylate, with acryloylmorpholine, 2-phenoxyethyl acrylate, (2,2,2-triacryloyloxymethyl)ethyl hydrogenphthalate and dipentaerythritol polyacrylate being preferred.

The monomer for use in the two-liquid type recording method has a molecular weight of from about 50 to about 3,000, preferably from about 50 to about 2,000.

In the case where the ink composition for use in the two-liquid type recording method contains the monomer, the content of the monomer in the ink composition is in the range of from about 1 to about 70% by weight, preferably from about 3 to about 50% by weight.

Additionally, the oligomer and the monomer have the property of forming a three-dimensional structure when copolymerized with each other. Therefore, the content of the oligomer or the monomer in the ink composition must be determined in consideration of polymerization efficiency, polymerization rate, volume shrinkage ratio after polymerization and strength of polymer coat. Further, in the case where one of the ink composition or the reactive solution for use in the two-liquid type recording method in accordance with the invention contains the oligomer, the other contains the monomer.

In the ink composition for use in the two-liquid type recording method, the aqueous solvent preferably comprises water and a water-soluble organic solvent. As the water and the water-soluble solvent, those referred to with respect to the aforesaid one-liquid type ink jet composition may be used.

Further, as optional components, a resin emulsion, an inorganic oxide colloid, a wetting agent, a pH-adjusting agent, an antiseptic and an antifungal agent may be added.

Typical examples of the polymerization initiator in the reactive solution for use in the two-liquid type recording method include benzoin methyl ether, benzoin ethy ether, benzoin isopropyl ether, benzoin isobutyl ether, 1-phenyl-1,2-propanedion-2-(o-ethoxycarbonyl)oxime, benzyl, diethoxyacetophenone, benzophenone, chlorothioxanthone, 2-chlorothioxaanthone, isopropylthioxanthone, 2-methylthioxanthone and hexachlorobenzene, with benzoin isobutyl ether and 1-phenyl-1,2-propanedion-2-(o-ethoxycarbonyl) oxime being preferred.

Also, polymerization initiators available with trade names of Vicure 10, 30 (made by Stauffer Chemical Co.), Irgacure 184, 651, 2959, 907, 369, 1700, 1800, 1850, 819 (made by Ciba Specialty Chemicals Co.), Darocure 1173 (made by EM Chemical Co.), Quantacure CTX, ITX (made by Aceto Chemical Co.) and Lucirin TPO (made by BASF) may be used as well.

The white ink for use in the two-liquid type ink jet recording method is particularly suitable for printing onto a recording medium such as paper or cloth into which an ink difficultly penetrate, or onto a plate or film produced from those materials into which an ink does not penetrate such as metal or plastic, e.g., a phenol resin, a melamine resin, polyvinyl chloride, an acrylic resin or polycarbonate.

EXAMPLES

The present invention will be illustrated in greater detail with reference to the following Examples, but the invention should not be construed as being limited thereto.

Examples of Producing Titanium Dioxide Slurry

Example 1

Titanium-containing ores were dissolved with sulfuric acid to obtain a titanium sulfate solution. This titanium sulfate solution was hydrolyzed to obtain hydrated titanium oxide. Then, to the resultant hydrated titanium oxide were added 0.50 part by weight of ammonium phosphate, 0.30 part by weight of potassium sulfate and 0.30 part by weight of aluminum sulfate per 100 parts by weight of $TiO_2$, followed by heating in a rotary muffle furnace for laboratory use till the temperature of the product reached 1,020° C. The thus produced titanium dioxide was cooled to room temperature and observed by means of a transmission electron microscope to find that the titanium dioxide was of anatase type having an average primary particle size of 0.13 μm.

1500 g of the thus surface-treated titanium dioxide and 1000 g of pure water were mixed with each other, and dispersed for 2 hours in a sand mill (made by Yasukawa Seisakusho) packed with zirconium beads (1.0 mm) in an amount 1.5 times as much as that of the slurry, followed by removing the beads to obtain a titanium dioxide slurry (A) for use in an ink jet white ink.

The average primary particle size, concentration, viscosity, pH, surface tension and particle size distribution of this slurry are shown in Table 1.

Comparative Example 1

Anatase type titanium dioxide "W-10" (made by Ishihara Sangyo K. K.) of 0.15 μm in average primary particle size produced by the sulfuric acid process was treated with 0.1% by weight, based on $TiO_2$, of tributyl phosphate with keeping the temperature at 170° C. by using steam.

This titanium dioxide was dispersed in the same manner as in Example 1 to obtain a titanium dioxide slurry (B). The average primary particle size, concentration, viscosity, pH, surface tension and particle size distribution of this slurry are shown in Table 1.

Comparative Example 2

1500 g of anatase type titanium dioxide "W-10" (made by Ishihara Sangyo K. K.) of 0.15 μm in average primary particle size produced by the sulfuric acid process and 1000 g of pure water were mixed with each other, and dispersed for 2 hours in a sand mill (made by Yasukawa Seisakusho) packed with zirconium beads (1.0 mm) in an amount 1.5 times as much as that of the slurry, followed by removing the beads to obtain a titanium dioxide slurry (C) for use in an ink jet white ink. The average primary particle size, concentration, viscosity, pH, surface tension and particle size distribution of this slurry are shown in Table 1.

Comparative Example 3

Rutile type titanium dioxide "TTO-55(N)" (made by Ishihara Sangyo K. K.) of 0.01 to 0.03 μm in average primary particle size produced by the chlorination process was dispersed in the same manner as in Comparative Example 1 to obtain a titanium dioxide slurry (D). The average primary particle size, concentration, viscosity, pH, surface tension and particle size distribution of this slurry are shown in Table 1.

Measuring Methods (1) Concentration of Slurry 1 to 2 g of the slurry was weighed in an aluminum cup and dried in a safety oven SPHH-100 (made by TABAI) at 110° C. for 4 hours. The solid component concentration was calculated from the amount of the evaporation residue.

(2) Viscosity

About 1 ml of the slurry was placed in a roter cup, and the viscosity was measured at 25° C. at 50 rpm using a model-E viscometer (made by Tokimec Inc.).

(3) pH

The pH was measured at 25° C. using a pH meter "F-23" (made by K. K. Horiba Seisakusho).

(4) Surface Tension

The surface tension was measured at 25° C. using a tensiometer "CBVP-Z" (made by Kyowa Kaimen Kagaku K. K.).

(5) Particle Size Distribution

The particle size distribution was measured using Microtrack UPA (made by Honeywell) without the pretreatment of ultrasonic dispersion. Ultrasuper water was used as a medium.

TABLE 1

| | | Ex. 1 | Com. Ex. 1 | Com. Ex. 2 | Com. Ex. 3 |
|---|---|---|---|---|---|
| Titanium dioxide slurry | | A | B | C | D |
| Average primary particle size (μm) | | 0.13 | 0.15 | 0.15 | 0.04 |
| Concentration of slurry (wt %) | | 59.8 | 58.7 | 60.1 | 60.5 |
| Viscosity (mPa · s) | | 3.2 | 5.8 | 12.3 | 4.6 |
| pH | | 7.1 | 6.4 | 8.5 | 5.3 |
| Surface tension (m/Nm) | | 62.4 | 58.1 | 58.2 | 61.7 |
| Particle size distribution | $d_{10}$(μm) | 0.13 | 0.15 | 0.20 | 0.09 |
| | $d_{50}$(μm) | 0.19 | 0.21 | 0.27 | 0.15 |
| | $d_{90}$(μm) | 0.27 | 0.30 | 0.35 | 0.23 |

Examples of Producing Ink

Example 2 and Comparative Examples 4 to 6

Components of the formulation shown below were mixed and stirred for 20 minutes using a three-one motor, followed by removing coarse particles and dust using a 5-μm membrane filter to obtain ink compositions for ink jet recording.

TABLE 2

| | Ex. 2 Ink A | Com. Ex. 4 Ink B | Com. Ex. 5 Ink C | Com. Ex. 6 Ink D |
|---|---|---|---|---|
| Titanium dioxide slurry (A) | 33.3 | | | |
| Titanium dioxide slurry (B) | | 33.3 | | |
| Titanium dioxide slurry (C) | | | 33.3 | |
| Titanium dioxide slurry (D) | | | | 33.3 |
| Glycerin | | 10.0 | | |
| Ion-exchanged water | | 56.7 | | |

Blending ratio: % by weight

This ink was filled in the head of an ink jet printer "MJ-830C" (manufactured by Seiko Epson K. K.) and solid printing was conducted on black wood free paper (Usukuchi) (made by Kishu Seisi K. K.) to compare background-hiding properties.

Also, printing was conducted after leaving the ink composition in the state of being filled in the printing head at an ordinary temperature for one day to evaluate the storage stability.

Furthermore, continuous printing was conducted for a long period of time using an ink jet printer "MJ-830C" (manufactured by Seiko Epson K. K.) to observe the presence or absence of dot deletion and ink scattering and to thereby evaluate the ejection stability.

TABLE 3

| | Ex. 2 Ink A | Com. Ex. 4 Ink B | Com. Ex. 5 Ink C | Com. Ex. 6 Ink D |
|---|---|---|---|---|
| Hiding properties | Good | Good | Good | Bad |
| Storage stability | Good | Good | Bad | Bad |
| Ejection Stability | A | C | D | D |

Hiding properties:
Good: Background black color was completely hidden.
Bad: Background black color was not completely hidden.
Storage stability:
Good: No precipitation of slurry. Printing was possible.
Bad: A precipitate of slurry was formed. Printing was impossible.
Ejection stability:
A: The number of occurrence of dot deletion or ink scattering was 10 or less upon a lapse of 48 hours.
B: The number of occurrence of dot deletion or ink scattering reaches 10 or more within a period of from 24 to 48 hours.
C: The number of occurrence of dot deletion or ink scattering reaches 10 or more within a period of from 1 to 24 hours.
D: The number of occurrence of dot deletion or ink scattering reaches 10 or more within 1 hour.

As is apparent from Table 3, the white ink of the Invention Example is excellent in each of hiding properties, storage stability and ejection stability.

The titanium dioxide slurry and the white ink of the invention are for use in an ink jet recording apparatus for recording characters or images using a liquid ink, and are excellent in preventing clogging and in ejection stability, storage stability and hiding properties.

In particular, by adjusting the concentration of the surface-treated titanium dioxide particles in the slurry to 30 to 70% by weight, there can be attained better hiding properties upon printing with maintaining stable dispersion.

Further, with the slurry wherein the titanium dioxide particles are dispersed in water with a specific particle size distribution, printing can be conducted with difficult clogging and excellent ejection stability due to the narrow particle size distribution and uniform particle size. Therefore, the ink is particularly suitable as an ink jet ink.

Further, by adjusting pH to a specific range, an attack by the ink to other members such as a printer head can be prevented.

Still further, by adjusting the viscosity to a specific range, the ejection stability can be more improved.

Yet further, by adjusting the surface tension to a specific range, the permeability of the ink is made suitable, thus distinct printed products being obtained.

While the invention had been described in detail and with reference to specific embodiments thereof, it will be apparent to one skilled in the art that various changes and modifications can be made therein without departing from the spirit and scope thereof.

What is claimed is:

1. A titanium dioxide slurry for ink jet ink, which comprises water and surface-treated titanium dioxide particles dispersed in said water, said slurry having a concentration of said surface-treated titanium dioxide particles of from 30 to 70% by weight, said surface treatment being a treatment with an inorganic phosphoric acid compound, wherein said surface-treated titanium dioxide particles having a dispersed particle diameter distribution satisfying the following relationships:

$0.1 \leqq d_{10} < 0.15$ ($\mu$m), $0.15 \leqq d_{50} < 0.25$ ($\mu$m), and $0.25 \leqq d_{90} < 0.4$ ($\mu$m)

wherein $d_{10}$, $d_{50}$ and $d_{90}$ denote particle diameters corresponding to cumulative weight fractions of 10%, 50% and 90%, respectively.

2. The titanium dioxide slurry according to claim 1, wherein said inorganic phosphoric acid compound comprises at least one member selected from the group consisting of phosphoric acid, ammonium phosphate and diammonium hydrogenphosphate.

3. The titanium dioxide slurry according to claim 1, having a pH in the range of from 5 to 9.

4. The titanium dioxide slurry according to claim 1, having a viscosity in the range of from 3.0 to 10.0 mPa·s.

5. The titanium dioxide slurry according to claim 1, having a surface tension in the range of from 50 to 71 mN/m.

6. An ink jet white ink, comprising a titanium dioxide slurry according to claim 1.

7. The ink jet white ink according to claim 6, having a content of said titanium dioxide slurry of from 1 to 50% by weight in terms of pure titanium oxide based on the total weight of the white ink.

8. The ink jet white ink according to claim 6, further comprising at least one of a water-soluble organic solvent, a wetting agent, a polymeric dispersant and a surfactant.

9. An ink jet ink, which contains a titanium dioxide slurry according to claim 1 and at least one of other pigments and dyes.

10. The ink jet ink according to claim 9, further comprising at least one of a water-soluble organic solvent, a wetting agent, a polymeric dispersant and a surfactant.

* * * * *